(12) United States Patent
Mori et al.

(10) Patent No.: US 11,194,364 B1
(45) Date of Patent: Dec. 7, 2021

(54) INFORMATION PROCESSING APPARATUS AND MODE SELECTION METHOD THEREFOR

(71) Applicant: LENOVO (SINGAPORE) PTE. LTD., Singapore (SG)

(72) Inventors: Hidetoshi Mori, Yokohama (JP); Nana Kudo, Yokohama (JP); Kenneth Scott Seethaler, Morrisville, NC (US); Adam Jerome Cavenaugh, Morrisville, NC (US)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 17/029,337

(22) Filed: Sep. 23, 2020

(51) Int. Cl.
*G06F 1/16* (2006.01)
*G06F 3/0482* (2013.01)
*G06F 1/3231* (2019.01)
*G06F 3/041* (2006.01)
*G06F 3/14* (2006.01)

(52) U.S. Cl.
CPC .......... *G06F 1/1677* (2013.01); *G06F 1/1643* (2013.01); *G06F 1/3231* (2013.01); *G06F 3/0416* (2013.01); *G06F 3/0482* (2013.01); *G06F 3/1423* (2013.01)

(58) Field of Classification Search
CPC .... G06F 1/1677; G06F 1/1643; G06F 1/3231; G06F 3/0416; G06F 3/0482; G06F 3/1423
See application file for complete search history.

(56) References Cited

U.S. PATENT DOCUMENTS

2011/0216064 A1* 9/2011 Dahl ..................... G06F 1/1677
345/428

* cited by examiner

*Primary Examiner* — Yaron Cohen
(74) *Attorney, Agent, or Firm* — Shimokaji IP

(57) ABSTRACT

An information processing apparatus includes a first chassis, a second chassis which is coupled to the first chassis to be openable and closable, a first display which is disposed on a first surface of the second chassis which faces the first chassis, a second display which is disposed on a second surface of the second chassis which is opposite to the first surface and a processing circuitry, in which the processing circuitry detects a lid close action that a user is about to close the first chassis or lid close, and in a case where the lid close action or the lid close is detected, displays a selection menu which is used for selecting a mode to be executed in a lid closed state and includes a plurality of modes on the first display or the second display.

12 Claims, 11 Drawing Sheets

INFORMATION PROCESSING APPARATUS AND MODE SELECTION METHOD THEREFOR

FIELD OF THE INVENTION

The present disclosure relates to an information processing apparatus and a mode selection method therefor.

BACKGROUND OF THE INVENTION

Nowadays, a technology of automatically switching an operation mode depending on an attitude and so forth of chassis of the information processing apparatus is known.

For example, in the field of a 2in1 PC which has two functions, that is, the function of a Laptop PC and the function of a tablet terminal simultaneously, a technology of automatically switching an operation mode between a tablet mode and a PC mode in accordance with, for example, an angle between a keyboard unit and a display unit is known.

In addition, in the field of a detachable type 2in1 PC that the keyboard unit and the display unit are configured to be separable, a technology of automatically switching the operation mode between the tablet mode and the PC mode in accordance with, for example, an attached/detached state of the keyboard unit is known.

SUMMARY OF THE INVENTION

However, there are many cases where such automatic switching of the operation mode as mentioned above does not necessarily meet a user's request and there are some cases where a user's freedom degree of selection is restricted. In addition, it is necessary for the user to change settings in advance in order to change an operation mode for automatic switching to a mode which meets the user's request, work of changing the settings is complicated and lacks in convenience.

The present disclosure aims to provide an information processing apparatus and a mode selection method therefor which make it possible to improve the degree of freedom of mode selection and convenience in mode switching.

An information processing apparatus according to the first aspect of the present disclosure includes a first chassis, a second chassis which is configured to be coupled to the first chassis to be openable and closable, a first display which is configured to be disposed on a first surface of the second chassis which faces the first chassis, a second display which is configured to be disposed on a second surface of the second chassis which is opposite to the first surface and a processing circuitry, in which the processing circuitry is configured to detect a lid close action that a user is about to close the first chassis or lid close, and in a case where the lid close action or the lid close is detected, display a selection menu which is used for selecting a mode to be executed in a lid closed state and includes a plurality of modes on the first display or the second display.

A mode selection method for an information processing apparatus which includes a first chassis, a second chassis which is configured to be coupled to the first chassis to be openable and openable, a first display which is configured to be disposed on a first surface of the second chassis which faces the first chassis, a second display which is configured to be disposed on a second surface of the second chassis which is opposite to the first surface and a processing circuitry according to the second aspect of the present disclosure is the mode selection method which includes detecting a lid close action that a user is about to close the first chassis or lid close by the processing circuitry and in a case where the lid close action or the lid close is detected, displaying a selection menu which is used for selecting a mode to be executed in a lid closed state and includes a plurality of modes on the first display or the second display by the processing circuitry.

DETAILED DESCRIPTION OF THE INVENTION

In the following, an information processing apparatus and a mode selection method therefor according to a first embodiment of the present disclosure will be described with reference to the drawings. Although, in each embodiment which will be described in the following, a description will be made by exemplifying a 2in1 PC as one example of an information processing apparatus 1, the example of the information processing apparatus 1 is not limited to the 2in1 PC.

Figure 1:
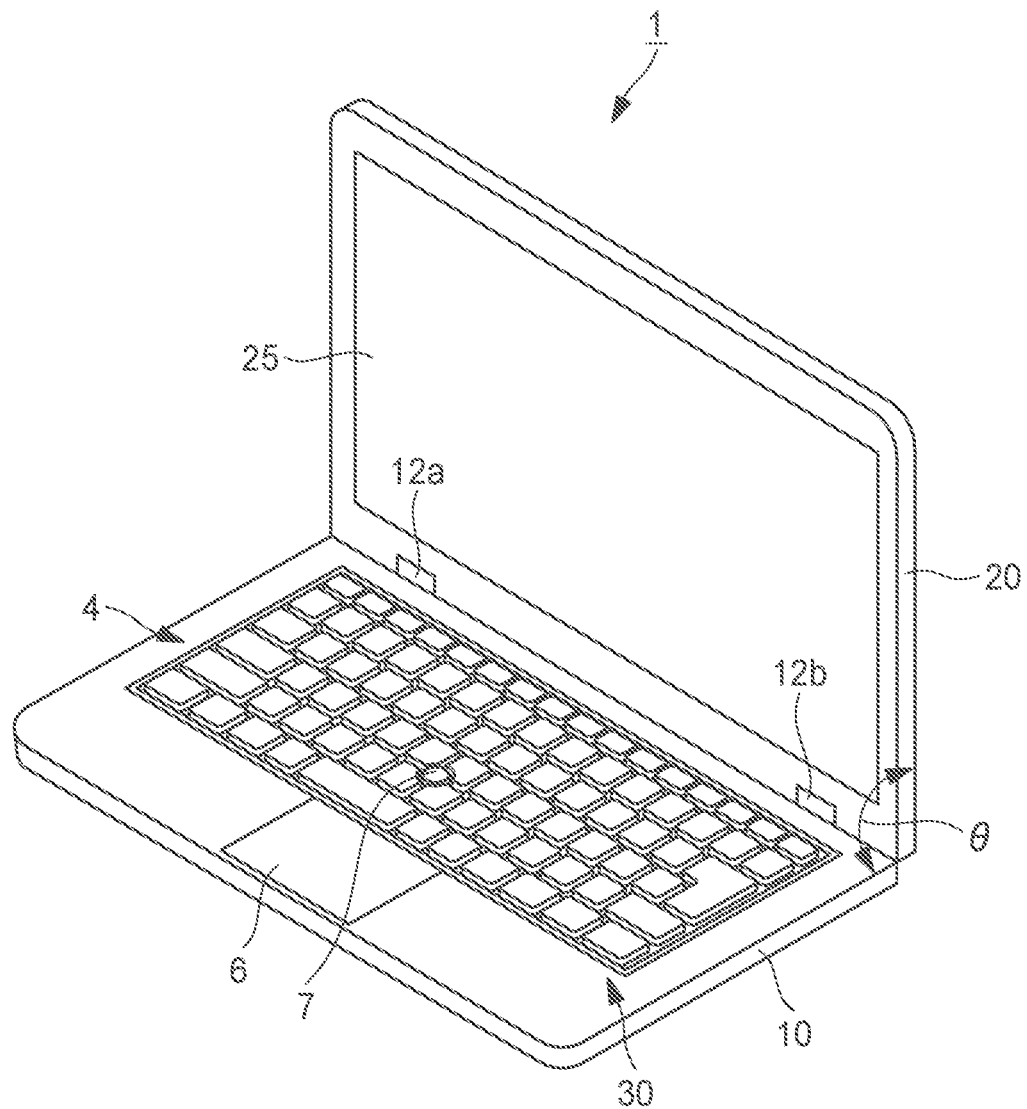
FIG. 1 is one schematic outside view illustrating one example of an information processing apparatus according to a first embodiment of the present disclosure.
Figure 2:
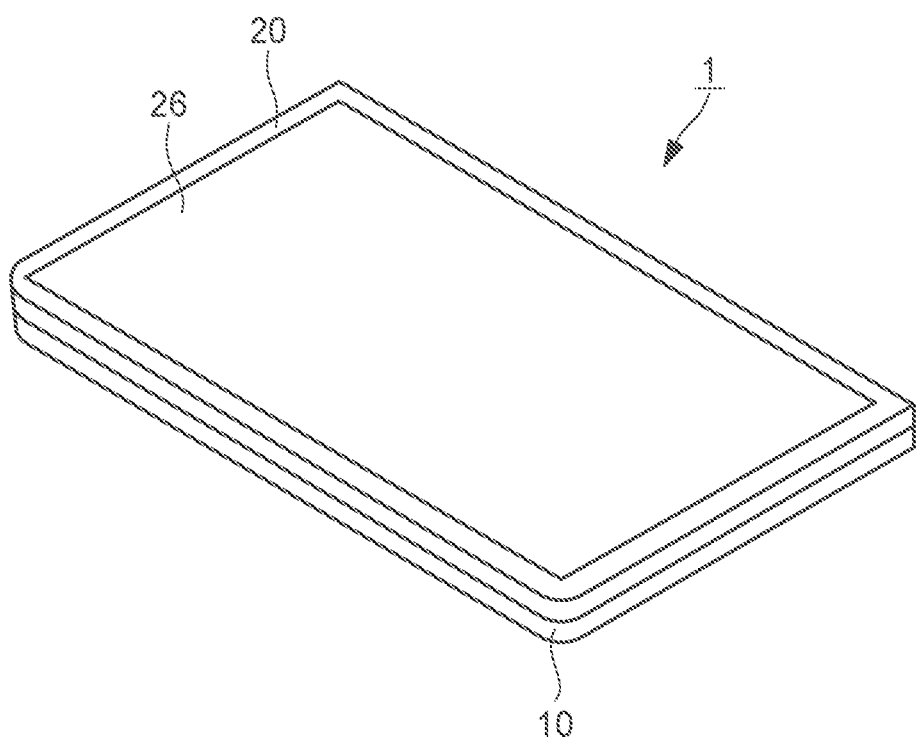
FIG. 2 is another schematic outside view illustrating one example of the information processing apparatus according to the first embodiment of the present disclosure.

FIG. 1 and FIG. 2 are schematic outside views illustrating examples of the information processing apparatus 1 according to the first embodiment of the present disclosure. FIG. 1 illustrates one example of a state where a second chassis 20 is opened relative to a first chassis 10 and FIG. 2 illustrates one example of a state where the second chassis 20 is closed relative to the first chassis 10, that is, a so-called lid closed state.

It is possible to use the information processing apparatus 1 as a Laptop PC by opening the second chassis 20 relative to the first chassis 10 as illustrated in FIG. 1 and to use the information processing apparatus 1 as a tablet terminal by closing the second chassis 20 relative to the first chassis 10 as illustrated in FIG. 2.

The information processing apparatus 1 includes the first chassis 10 and the second chassis 20 as illustrated in FIG. 1. The first chassis 10 and the second chassis 20 are coupled together via coupling members 12a, 12b to be openable and closable. Hinges may be given as one example of the coupling members 12a, 12b.

The first chassis 10 is almost rectangular and an input unit 30 is disposed on a first surface of the first chassis 10. The input unit 30 is a user interface that a user uses for performing an input operation. In the example in FIG. 1, the input unit 30 has a keyboard 4, a touch pad 6, a track point 7 and so forth. Incidentally, the input unit 30 may be a software keyboard and so forth. That is, the first surface of the first chassis 10 may have a touch panel and the touch panel may be made to function as the input unit 30 by displaying a screen of a keyboard and so forth on the touch panel.

The second chassis 20 is almost rectangular and includes a first display 25 which is disposed on a first surface which faces the first chassis 10. For example, a first touch panel 8 (see FIG. 3) which functions as the input unit 30 is superimposed on the first display 25. In addition, a second display 26 is disposed on a second surface of the second chassis which is opposite to the first surface thereof as illustrated in FIG. 2. For example, a second touch panel 9 which functions as the input unit 30 is superimposed on the second display 26.

An angle between the first chassis 10 and the second chassis 20 is defined as an attitude angle θ as illustrated in FIG. 1. In an opened state which is illustrated in FIG. 1, the attitude angle θ is about 90 degrees and in a closed state which is illustrated in FIG. 2, the attitude angle θ is about zero degrees.

Figure 3:
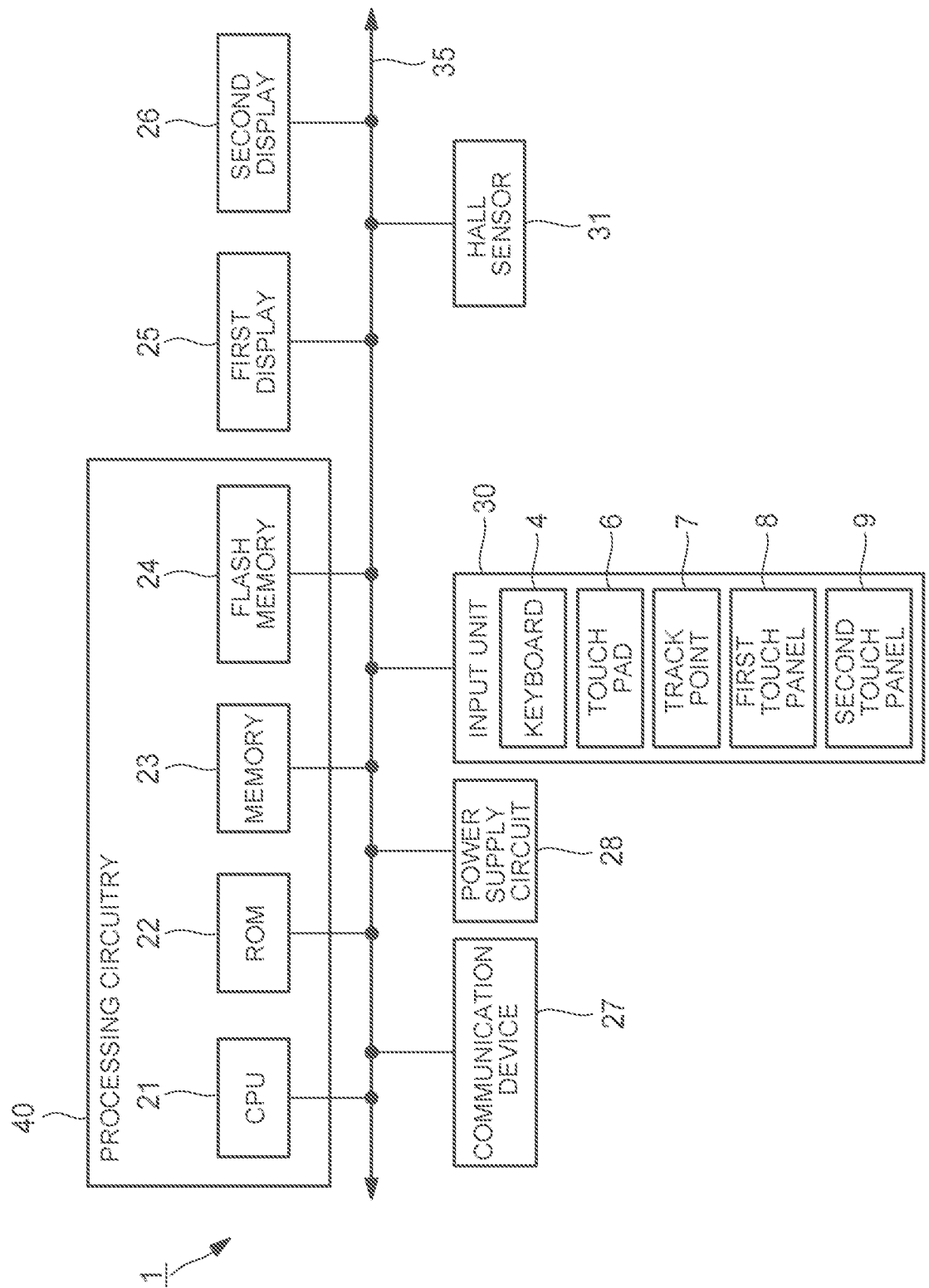
FIG. 3 is a schematic configuration diagram illustrating one example of hardware configurations that the information processing apparatus according to the first embodiment of the present disclosure includes.

FIG. 3 is a schematic configuration diagram illustrating one example of hardware configurations that the information processing apparatus 1 according to the first embodiment includes. The information processing apparatus 1 includes a processing circuitry 40, the first display 25, the second display 26, a communication device 27, a power supply circuit 28, the input unit 20 and a Hall sensor 31. These elements are electrically connected together directly or indirectly via a bus 35.

As the hardware configurations of the processing circuitry 40, for example, a CPU (Central Processing Unit) 21, a ROM (Read Only Memory) 22, a memory 23, a flash memory 24 and so forth are given.

The CPU 21 controls operations of the entire information processing apparatus 1 on the basis of an OS (Operating System) which is stored in the flash memory 24 which is connected to the CPU 21 via the bus 35 and executes processes which are based on various programs which are stored in the flash memory 24 and so forth.

The ROM 22 stores therein a BIOS (Basic Input/Output System), various data and so forth.

The memory 23 is a writable memory which is configured by a cache memory and a RAM (Random Access Memory) and is utilized as a work area into which execution programs of the CPU 21 are read and data which is processed in accordance with the execution programs is written.

The flash memory 24 stores therein OSs used for controlling the operations of the entire information processing apparatus 1 such as, for example, Windows (registered trademark), iOS (registered trademark), Android (registered trademark) and so forth, various drivers used for operating peripherals in hardware, utility programs, various application programs and so forth. Incidentally, the information processing apparatus 1 may include another/other memory/memories such as an HDD (Hard Disk Drive) and so forth as the memory/memories which take(s) the place of the flash memory 24.

The first display 25 displays a video signal as an image in accordance with control of the processing circuitry 40 (specifically, the CPU 21). For example, an LCD (Liquid Crystal Display), an OLED (Organic Light Emitting Diode) display and so forth are given as examples of the first display 25.

The second display 26 displays the video signal as the image in accordance with control of the processing circuitry 40 (specifically, the CPU 21) similarly to the first display 25. For example, the LCD, the OLED display and so forth are also given as examples of the second display 26.

The communication device 27 controls communication of the information processing apparatus 1 with other devices over a network.

The power supply circuit 28 includes an AC adapter, a battery, a charger which charges the battery, a DC/DC converter and so forth and supplies power to the respective elements in accordance with control of the processing circuitry 40 (specifically, the CPU 21).

The input unit 30 includes the keyboard 4, the touch pad 6, the track point 7, the first touch panel 8, the second touch panel 9 and so forth.

The first touch panel 8 includes a plurality of touch sensors. It is possible to adopt a well-known system such as, for example, a capacitance system, a pressure-reduction system and so forth as a system on the basis of which the touch sensors detect various operations.

The second touch panel 9 includes a plurality of touch sensors and it is possible to adopt the well-known system such as, for example, the capacitance system, the pressure-reduction system and so forth as the system on the basis of which the touch sensors detect the various operations similarly to the first touch panel 8.

The Hall sensor 31 includes a Hall element in either one of the first chassis 10 and the second chassis 20 and includes a magnet in the other chassis. The Hall element is disposed in the first chassis 10 and the magnet is disposed in the second chassis 20 as one example. The Hall element is disposed in the first chassis 10 and the magnet is disposed in the second chassis 20 in such a manner that the Hall element and the magnet mutually face in a state where the second chassis 20 is closed relative to the first chassis 10.

In the Hall sensor 31, the Hall element detects a magnetic field that the magnet generates and outputs a sensor value which depends on magnetic field intensity. It becomes possible for the processing circuitry 40 to decide an opened/closed state of the second chassis 20 relative to the first chassis 10 on the basis of the sensor value that the Hall element detects.

Figure 4:
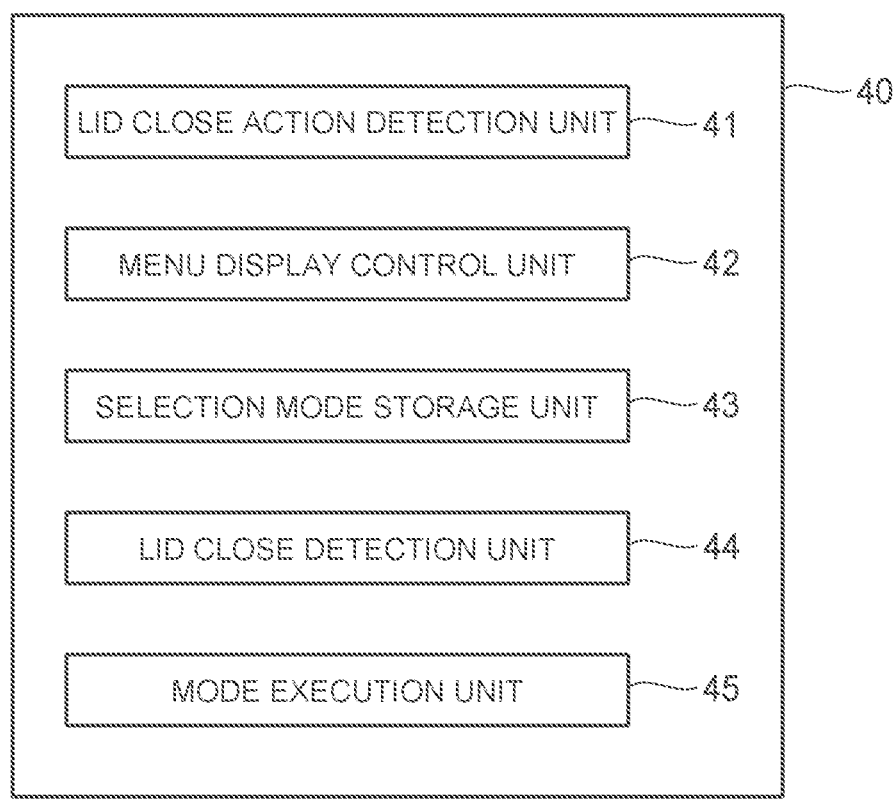
FIG. 4 is a function block diagram illustrating one example of a mode selection function that the information processing apparatus according to the first embodiment of the present disclosure includes.

FIG. 4 is a function block diagram illustrating one example of a mode selection function that the information processing apparatus 1 according to the first embodiment has. The processing circuitry 40 executes a series of processes for realizing various functions which will be described later. For example, processing procedures for realizing the various functions which will be described later are stored in computer-readable storage media such as the ROM 22, the flash memory 24 and so forth in the form of programs. The CPU 21 reads these programs into the memory 23 and executes information processing-arithmetic processing and thereby the various functions are realized. Incidentally, the programs may be applied in the form of being installed in advance in the flash memory 24 and the ROM 22, the form of being provided in a state of being stored in another/other computer-readable storage medium/media, the form of being distributed via a wired or wireless communication unit and so forth. The computer-readable storage media are a magnetic disc, a magneto-optical disc, a CD (Compact Disc)-ROM, a DVD (Digital Versatile Disc)-ROM, a semiconductor memory and so forth.

The information processing apparatus 1 includes a lid close action detection unit 41, a menu display control unit 42, a selected mode storage unit 43, a lid close detection unit 44 and a mode execution unit 45 as illustrated in FIG. 4.

The lid close action detection unit 41 detects a lid close action that a user is about to close the second chassis 20 relative to the first chassis 10.

Figure 5:
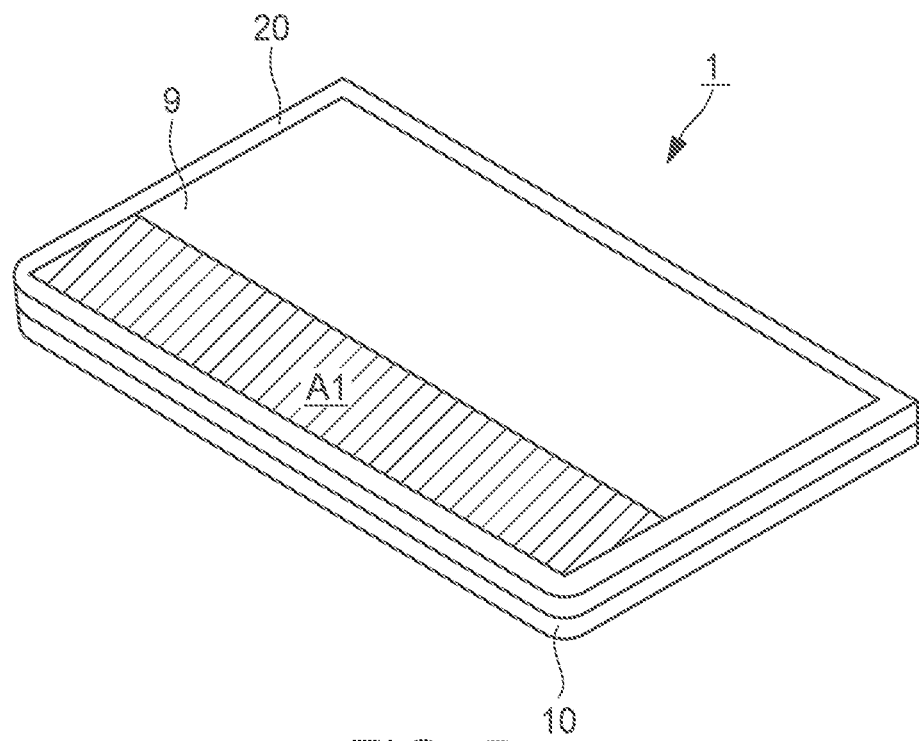
FIG. 5 is an explanatory diagram illustrating one example of a lid close detection area in the information processing apparatus according to the first embodiment of the present disclosure.

For example, in a case where touches of the number which is more than a predetermined number are simultaneously detected in a lid close detection area A1 which is virtually disposed at a predetermined position on the second touch panel 9, the lid close action detection unit 41 detects the lid close action. The lid close detection area A1 is virtually disposed in the vicinity of one side section of the second touch panel 9 which is opposite to the other side section thereof (in a longitudinal direction) which is close to the coupling part between the first chassis 10 and the second chassis 20, for example, as illustrated by a shaded section in FIG. 5. In addition, the predetermined number is appropriately set, for example, in a range from 2 or more to 4 or less.

In addition, as an alternative may, for example, in a case where one touch and touches of the number which exceeds a predetermined number are simultaneously detected in an upper area of the first touch panel 8 and in an upper area of the second touch panel 9 respectively, the lid close action detection unit 41 may detect the lid close action. The predetermined number is appropriately set in a range from 1 or more to 4 or less.

In a case where the user performs the lid close action, in other words, the user is about to close the second chassis 20 relative to the first chassis 10, the user often closes the second chassis 20 by holding an upper section of the second chassis 20, that is, somewhere of a region where the lid close detection area A1 is set with his/her fingers or pressing the finger against the region. The above-mentioned way of detecting the lid lose action is based on such a behavior that the user generally exhibits.

In a case where the lid close action is detected, the menu display control unit 42 controls to display the selection menu on the first display 25. The selection menu is used for selecting one mode to be executed in the lid closed state and includes a plurality of modes as options.

Figure 6:
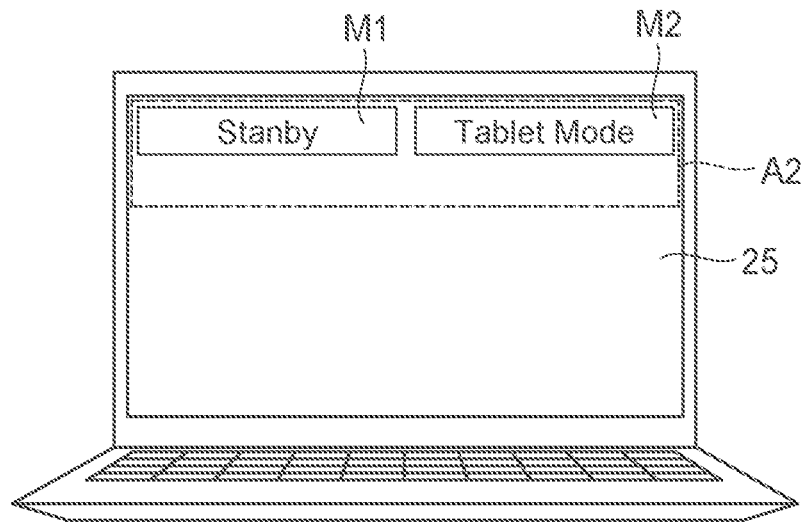
FIG. 6 is a diagram illustrating one display example of a selection menu in the information processing apparatus according to the first embodiment of the present disclosure.

For example, the menu display control unit 42 controls to display the selection menu which includes the plurality of modes in a menu display area A2 which is disposed on an upper region of the first display 25 as illustrated in FIG. 6. The menu display area A2 is virtually disposed in the vicinity of one side section of the first display 25 which is opposite to the other side section thereof (in the longitudinal direction) which is close to the coupling part between the first chassis 10 and the second chassis 20, in other words, on the upper region of the first display 25.

In a case where the user performs the lid close action, it becomes possible to display the selection menu around a position where the user holds the second chassis 20 with his/her hand by virtually disposing the menu display area A2 on the upper region of the first display 25. Thereby, it becomes possible for the user to select one desirable mode from the selection menu with ease while holding the second chassis 20 with the hand or without making a big movement with the hand.

It is possible to execute all the plurality of modes which are displayed in the form of the selection menu in the lid closed state where the second chassis 20 is closed relative to the first chassis 10 (see FIG. 2).

Figure 7:
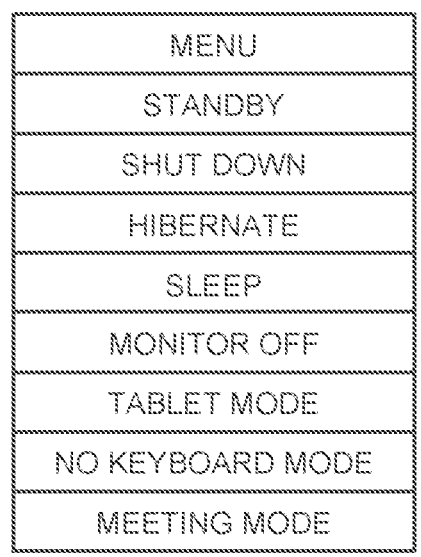
FIG. 7 is a diagram illustrating one example of modes which configure the selection menu in the information processing apparatus according to the first embodiment of the present disclosure.

Each mode which configures the selection menu relates to, for example, a power save function, a screen display function or an operation mode. In a display example of the selection menu which is illustrated in FIG. 6, "STANDBY (mode)" M1 which relates to the power save function and "TABLET MODE" M2 which relates to the operation mode are illustrated. FIG. 7 is a diagram illustrating one example of the modes which configure the selection menu. A "STANDBY" mode, a "SHUT DOWN" mode, a "HIBERNATE" mode, a "SLEEP" mode, a "MONITOR OFF" mode, "TABLET MODE", "NO KEYBOARD MODE" and "MEETING MODE" may be given as examples of the modes which configure the selection menu as illustrated in FIG. 7. Incidentally, these modes are merely examples and the modes to be executed are not limited to these examples.

The "STANDBY" mode, the "SHUT DOWN" mode, the "HIBERNATE" mode, the "SLEEP" mode and the "MONITOR OFF" mode relate to a well-known power save function. Incidentally, these various modes are well known and therefor description thereof is omitted.

The "TABLET MODE" M2 relates to the operation mode. The "TABLET MODE" is the well-known operation mode and in this mode, for example, screen display, operations and so forth which are suited for the tablet terminal are performed.

The "NO KEYBOARD MODE" and the "MEETING MODE" relate to the screen display function. In the "NO KEYBOARD MODE", contents which are displayed on the first display 25 are copied and displayed on the second display 26 in the lid closed state. That is, in the "NO KEYBOARD MODE", contents which are the same as the contents which are displayed on the first display 25 are displayed on the second display 26.

In the "MEETING MODE", a screen which is suited for a meeting is displayed and a word processing application and a calendar are launched and displayed on the second display 26 as one example.

In a case where any one of the modes in the selection menu which is displayed in accordance with control of the menu display control unit 42 is selected by the user, the selected mode storage unit 43 stores therein the selected mode.

The lid close detection unit 44 detects the lid close. The lid close means an event that the second chassis 20 is changed from a state of being opened relative to the first chassis 10 to a state of being closed relative to the first chassis 10 and detection of the lid close means to detect that the second chassis 20 is changed from the state of being opened relative to the first chassis 10 to the state of being closed relative to the first chassis 10 as illustrated in FIG. 2.

The lid close detection unit 44 detects the lid close on the basis of, for example, the sensor value from the Hall sensor 31. The magnetic field intensity which is detected by the Hall element is more increased as the first chassis 10 and the second chassis come closer to each other and the sensor value is increased accordingly. Therefore, for example, in a case where the sensor value is more than a threshold value which is set in advance, the lid close detection unit 44 detects the lid close.

In a case where the lid close is detected by the lid close detection unit 44, the mode execution unit 45 executes the mode which is stored in the selected mode storage unit 43. As a result, for example, in a case where the "TABLET MODE" M2 is selected in the display example of the selection menu which is illustrated in FIG. 6, the mode execution unit 45 executes the tablet mode. Thereby, a display screen which is suited to use the information processing apparatus 1 as the tablet terminal is displayed on the second display 26 in the lid closed state. In addition, in a case where any mode is not stored in the selected mode storage unit 43, the mode execution unit 45 executes a mode which is set in advance as a default.

Figure 8:
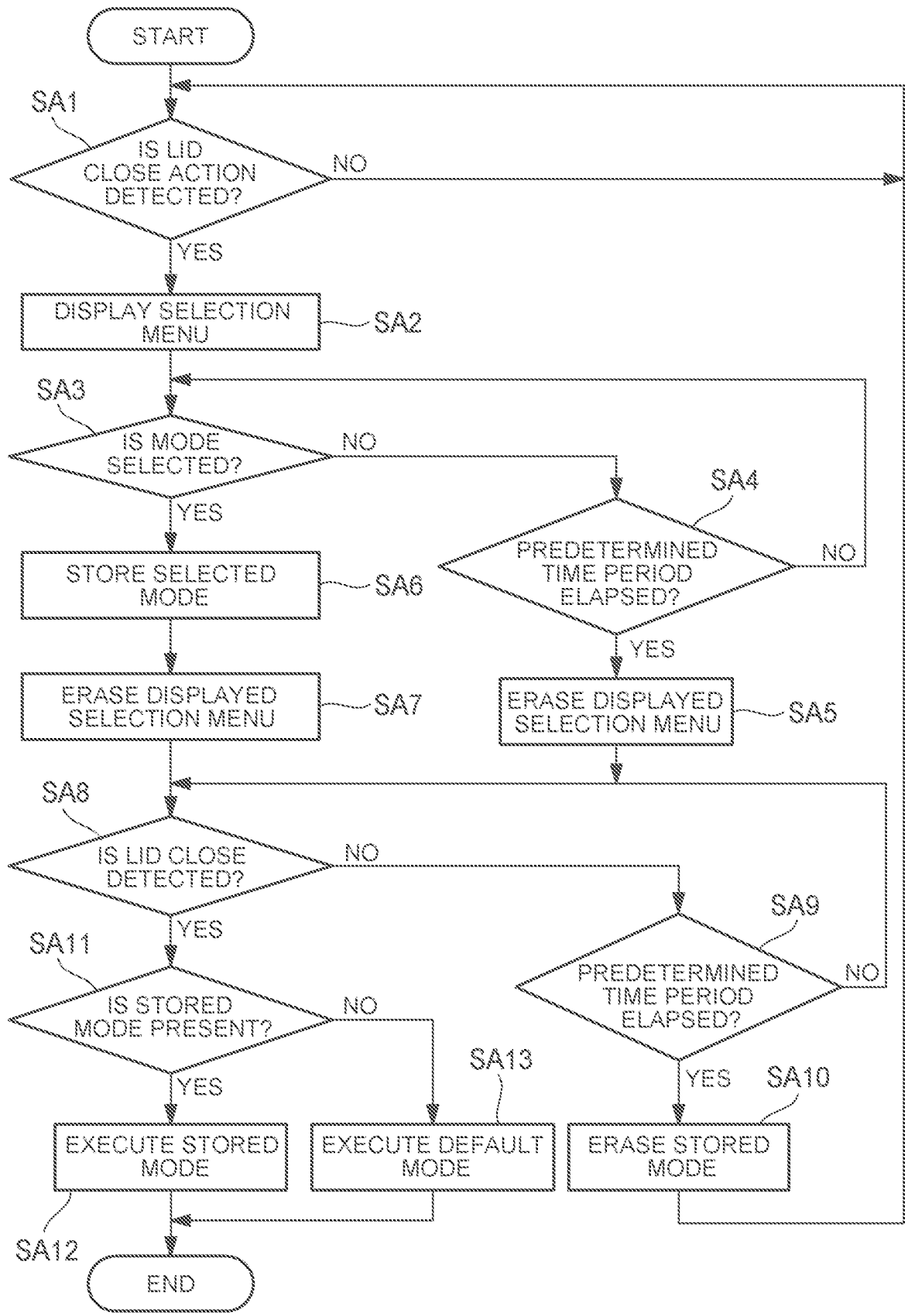
FIG. 8 is a flowchart illustrating one example of processing procedures of a mode selection method for the information processing apparatus according to the first embodiment of the present disclosure.

Next, a mode selection method for the information processing apparatus 1 according to the first embodiment will be described with reference to FIG. 8. FIG. 8 is a flowchart illustrating one example of processing procedures of the mode selection method for the information processing apparatus 1 according to the first embodiment.

Respective processes which are indicated in the following are stored in the computer-readable storage media such as, for example, the ROM 22, the flash memory 24 and so forth in the form of programs and the CPU 21 of the processing circuitry 40 reads out these programs into the memory 23 and executes information processing-arithmetic processing and thereby sequentially proceeds with the processes. Incidentally, the programs may be also applied in the form of being installed in advance in the flash memory 24 and the ROM 22, the form of being provided in a state of being stored in another/other computer-readable storage medium/media, the form of being distributed via the wired or wireless communication unit and so forth. The computer-readable storage media are the magnetic disc, the magneto-optical disc, the CD-ROM, the DVD-ROM, the semiconductor memory and so forth.

The mode selection method for the information processing apparatus 1 which is illustrated in FIG. 8 is processing which is repetitively executed at a predetermined timing or at predetermined time intervals in a time period that the lid close is not detected.

First, whether the lid close action is detected is decided (SA1). In a case where the lid close action is not detected (SA1: NO), a stand-by state lasts until the lid close action is detected.

In a case where the lid close action is detected (SA1: YES), the selection menu which includes the plurality of modes is displayed in the menu display area A2 (see FIG. 6) on the first display 25 (SA2). Then, whether any one of the modes is selected from the displayed selection menu by the user is decided (SA3). As a result of decision, in a case where any mode is not selected (SA3: NO), whether a predetermined time period has elapsed is decided (SA4), and in a case where the predetermined time period does not elapse (SA4: NO), the process returns to step SA3. On the other hand, in a case where it is decided that the predetermined time period has elapsed (SA4: YES), the selection menu which is displayed on the first display 25 is erased (SA5) and the process shifts to step SA8.

On the other hand, in a case where one mode is selected by the user (SA3: YES), the selected mode is stored (SA6). Thereby, information on the selected mode is temporarily stored in a predetermined memory area of the processing circuitry 40. Then, the selection menu which is displayed on the first display 25 is erased (SA7).

Next, whether the lid close is detected is decided (SA8). As a result of decision, in a case where the lid close is not detected (SA8: NO), whether the predetermined time period has elapsed is decided (SA9) and in a case where the predetermined time period does not elapse (SA9: NO), the process returns to step SA8. On the other hand, in a case where the predetermined time period has elapsed (SA9: YES), the mode which is stored in step SA6 is erased from the memory 23 (SA10) and the process returns to step SA1. Thereby, the flow returns to a state obtained before the lid close action is detected. Incidentally, in a case where mode selection is not performed (SA3: NO), since any mode is not stored in the memory 23, after making an affirmative decision in SA9, the process returns to step SA1 with no execution of the process in step SA10.

On the other hand, in a case where the lid close is detected (SA8: YES), whether the mode which is stored in step SA6 is present is decided (SA11). As a result of decision, in a case where the stored mode is present (SA11: YES), the stored mode is executed (SA12) and execution of this processing is terminated. Thereby, the mode which is selected by the user, that is, the mode that the user wishes to execute is executed in the lid closed state. On the other hand, in a case where the stored mode is not present (SA11: NO), the mode which is set in advance as the default is executed (SA13) and execution of this processing is terminated.

Then, in addition, in a case where the second chassis 20 is opened relative to the first chassis 10 from the lid closed state and thereby the lid close is no longer detected, the mode selection method is again executed.

Next, one example of software configurations for realizing the mode selection method for the information processing apparatus 1 will be described with reference to FIG. 9.

Figure 9:
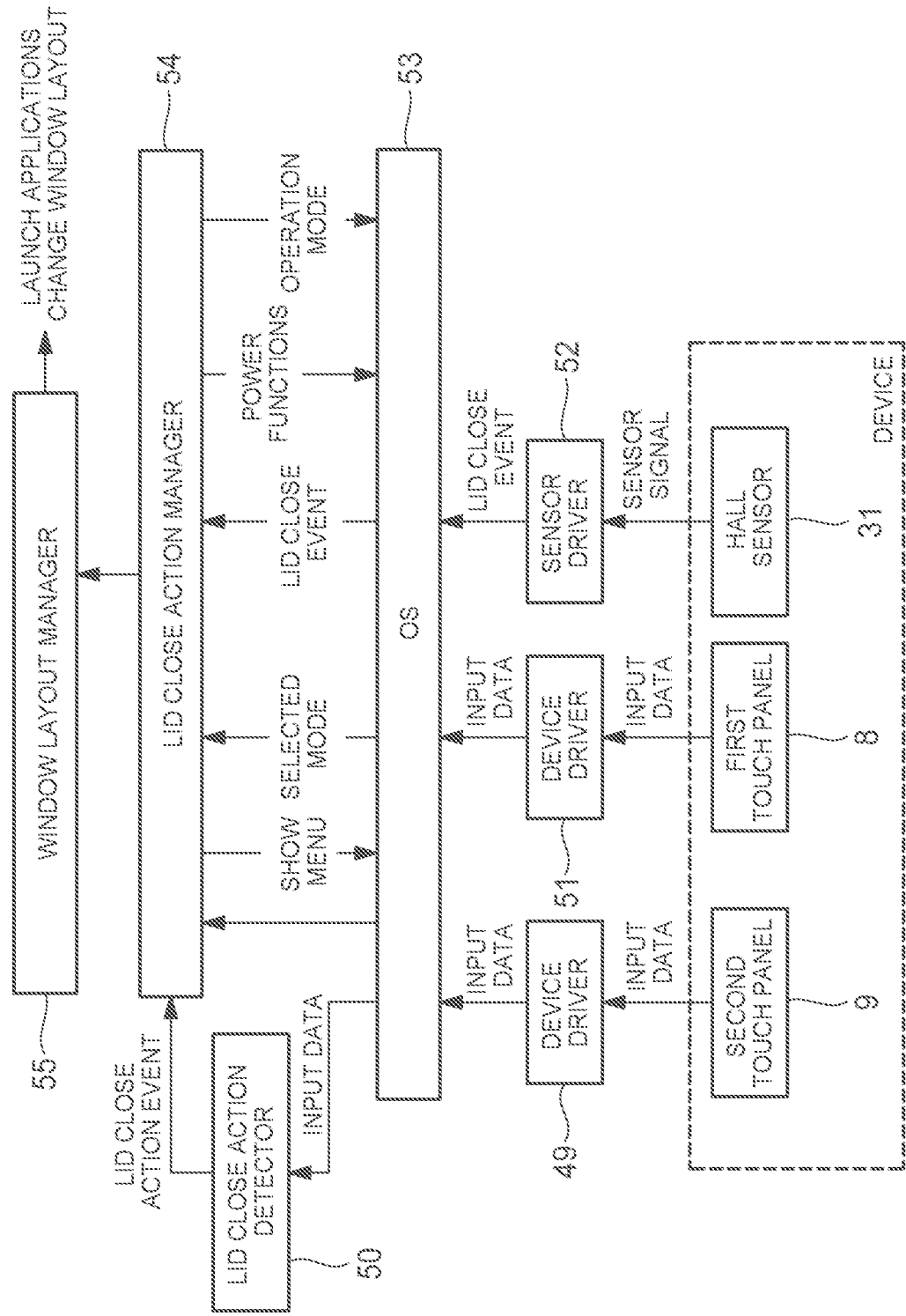
FIG. 9 is a diagram illustrating one example of software configurations for realizing the mode selection method for the information processing apparatus according to the first embodiment of the present disclosure.

The information processing apparatus 1 includes a device driver 49, a lid close action detector 50, a device driver 51, a sensor driver 52, an OS 53, a lid close action manager 54 and a window layout manager 55 as illustrated in FIG. 9.

The lid close action detector 50 typically monitors inputs from the second touch panel 9 and in a case where the touches of the number which is more than the predetermined number are simultaneously detected, notifies the lid close action manager 54 of a lid close action event. In the example in FIG. 9, a function of the lid close action detection unit 41 (see FIG. 4) is realized by the lid close action detector 50 in this way. Although, here, whether the lid close action is detected is decided on the basis of the inputs from the second touch panel 9, a way of detecting the lid close action is not limited to this example. For example, whether the lid close action is detected may be decided by arithmetically calculating the attitude angle θ of the information processing apparatus 1 as will be described later.

The lid close action manager 54 receives the lid close action event from the lid close action detector 50 and then outputs a selection menu display command which instructs to display the selection menu to the OS 53.

Thereby, the selection menu which is configured by the various modes is displayed in the menu display area A2 on the first display 25. Examples of the modes which are displayed here are as described by using FIG. 6 and FIG. 7. In the example in FIG. 9, a function of the menu display control unit 42 (see FIG. 4) is realized by the OS 53 in this way.

In a case where an input operation for selecting any one of the modes which are displayed on the first display 25 is performed by the user, a signal from each touch sensor which configures the first touch panel 8 is output to the device driver 51 and an input signal (for example, a coordinate position of each touch) is output from the device driver 51 to the OS 53. The OS 53 interprets the mode which is selected by the user on the basis of the input signal and a screen configuration of the first display 25 and outputs the mode to the lid close action manager 54. The lid close action manager 54 temporarily stores the mode which is notified from the OS 53 therein. In the example in FIG. 9, a function of the selection mode storage unit 43 (see FIG. 4) is realized by the lid close action manager 54 in this way.

Then, in a case where a distance between the first chassis 10 and the second chassis 20 is gradually reduced and thereby the sensor value of the Hall sensor 31 is gradually increased and becomes more than the predetermined threshold value, a lid close event is output from the sensor driver 52 to the OS 53. In the example in FIG. 9, a function of the lid close detection unit 44 (see FIG. 4) is realized by the sensor driver 52 in this way.

The OS 53 receives a notification of the lid close event and then notifies the lid close action manager 54 of the lid close event. The lid close action manager 54 receives the lid close event and then, for the purpose of executing the mode which is temporarily stored, outputs an execution command to a notification destination which accords with the function of the mode which is temporarily stored.

For example, in a case where the mode which is selected by the user relates to the power save function, specifically, in a case where the mode is any one of the "STANDBY" mode, the "SHUT DOWN" mode, the "HIBERNATE" mode, the "SLEEP" mode and the "MONITOR OFF" mode which are illustrated in FIG. 7, the lid close action manager 54 outputs a power save execution command which corresponds to the selected mode to the OS 53. Thereby, the OS 53 executes the process concerned on the basis of the power save execution command which is output from the lid close action manager 54. Thereby, the power save function which corresponds to the mode which is selected by the user is realized.

In addition, in a case where the mode which is selected by the user is the operation mode, specifically, in a case where the selected mode is the "TABLET MODE" which is illustrated in FIG. 7, the lid close action manager 54 outputs an execution command which corresponds to the tablet mode to the OS 53. Thereby, the OS 53 executes the tablet mode.

In addition, in a case where the mode which is selected by the user relates to a screen display function, specifically, in a case where the selected mode is the "NO KEYBOARD MODE" or the "MEETING MODE" which is illustrated in FIG. 7, the lid close action manager 54 outputs an execution command which corresponds to the selected mode to the window layout manager 55. Thereby, a display screen which accords with the mode which is selected by the user is displayed on the second display 26. For example, in a case where the "NO KEYBOARD MODE" is selected by the user, the display screen on the first display 25 is copied and displayed on the second display 26. In addition, in a case where the "MEETING MODE" is selected by the user, the word processing application and the calendar are launched and displayed on the second display 26.

In the example in FIG. 9, a function of the mode execution unit 45 (see FIG. 4) is realized by the OS 53 or the window layout manager 55 in accordance with the mode which is selected by the user in this way.

As described above, according to the information processing apparatus 1 and the mode selection method therefor pertaining to the first embodiment, in a case where the lid close action is detected, the options of the modes execution of which is possible in the lid closed state are displayed on the first display 25 in the form of the selection menu. Since the plurality of modes is automatically displayed on the first display 25 as the options in this way, it becomes possible to switch the mode to be executed in the lid closed state by a simple action of selecting one desirable mode from the plurality of modes.

Thereby, it becomes possible to improve the degree of freedom of user's selection in mode switching in comparison with a case where the mode is automatically switched to a fixed mode which is set in advance. In addition, it becomes possible to improve the convenience in mode switching in comparison with a case where mode switching is performed by changing settings of a system.

Incidentally, although in the first embodiment, the lid close is detected by the Hall sensor 31 as one example, detection of the lid close is not limited to this example. For example, as in a second embodiment which will be described later, acceleration sensors may be disposed on the first chassis 10 and the second chassis 20 respectively in such a manner that in a case where the attitude angle θ of the information processing apparatus 1 is arithmetically calculated on the basis of sensor values of the acceleration sensors and the attitude angle θ reaches a lid close angle threshold value (which is appropriately set in a range from zero degrees or more to 30 degrees or less as one example) which is set in advance, the lid close is detected.

In addition, as another example, a physical switch sensor may be disposed on the first surface of the first chassis 10 or the first surface of the second chassis 20 in such a manner that in a case where the second chassis 20 is closed relative to the first chassis 10 and thereby the physical switch sensor is pushed down, the lid close is detected.

It is possible to apply various well-known technologies as the way of detecting the lid closed state in this way.

In addition, although in the first embodiment, the lid close action is detected on the basis of the state of touching the touch panel as one example, detection of the lid close action is not limited to this example. For example, as in the second embodiment which will be described later, the acceleration sensors may be disposed on the first chassis 10 and the second chassis 20 respectively in such a manner that in a case where the attitude angle θ of the information processing apparatus 1 is arithmetically calculated on the basis of the sensor values of the acceleration sensors and the attitude angle θ reaches an action angle threshold value (which is appropriately set in a range from 45 degrees or more to 60 degrees or less as one example) which is set in advance, the lid close action is detected.

Next, an information processing apparatus 1a and a mode selection method therefor according to the second embodiment of the present disclosure will be described with reference to the drawings.

Incidentally, in the second embodiment, the numerals which are commonly used in the first and second embodiments are assigned to configurations which are the same as those in the first embodiment, description thereof is omitted and points which are different from those in the first embodiment will be mainly described.

Figure 10:
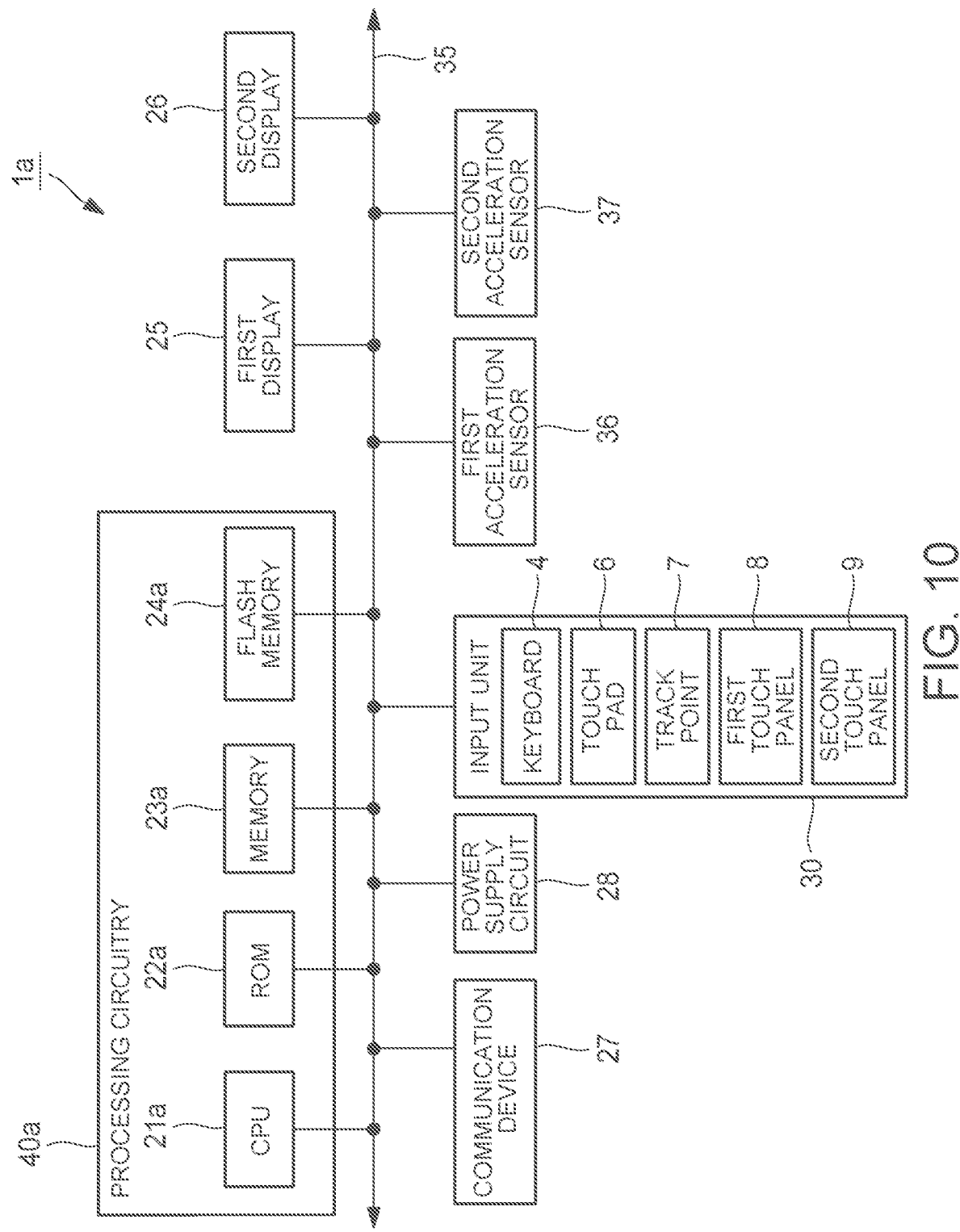
FIG. 10 is a schematic configuration diagram illustrating one example of hardware configurations that an information processing apparatus according to a second embodiment of the present disclosure includes.

FIG. 10 is a schematic diagram illustrating one example of hardware configurations of the information processing apparatus 1a according to the second embodiment.

As illustrated in FIG. 10, the information processing apparatus 1a according to the second embodiment includes a processing circuitry 40a, the first display 25, the second display 26, the communication device 27, the power supply circuit 28, the input unit 30, a first acceleration sensor 36 and a second acceleration sensor 37. The processing circuitry 40a includes a CPU 21a, a ROM 22a, a memory 23a and a flash memory 24a. Here, although these hardware configurations that the processing circuitry 40a includes are the same as the hardware configurations of the processing circuitry 40 in the first embodiment, processing contents of the CPU 21a are different from the processing contents of the CPU 21 in the first embodiment, the numerals which are different from those in the first embodiment are assigned to these hardware configurations for convenience sake.

The first acceleration sensor 36 is disposed in the first chassis 10. The first acceleration sensor 36 detects accelerations in an $X_1$ direction which is parallel with a longitudinal direction of the first chassis 10, a $Y_1$ direction which is parallel with a lateral direction of the first chassis 10 and a $Z_1$ direction which is vertical to the $X_1$ and $Y_1$ directions and outputs acceleration values $Ax_1(t)$, $Ay_1(t)$ and $Az_1(t)$ in the $X_1$, $Y_1$ and $Z_1$ directions to the processing circuitry 40a. The first acceleration sensor 36 detects the accelerations in the $X_1$, $Y_1$ and $Z_1$ directions and thereby it becomes possible to detect an orientation of the first chassis 10.

The second acceleration sensor 37 is disposed in the second chassis 20. The second acceleration sensor 37 detects accelerations in an $X_2$ direction which is parallel with a longitudinal direction of the second chassis 20, a $Y_2$ direction which is parallel with a lateral direction of the second chassis 20 and a $Z_2$ direction which is vertical to the $X_2$ and $Y_2$ directions and outputs acceleration values $Ax_2(t)$, $Ay_2(t)$ and $Az_2(t)$ in the $X_2$, $Y_2$ and $Z_2$ directions to the processing circuitry 40a. The second acceleration sensor 37 detects the accelerations in the $X_2$, $Y_2$ and $Z_2$ directions and thereby it becomes possible to detect an orientation of the second chassis 20.

Figure 11:
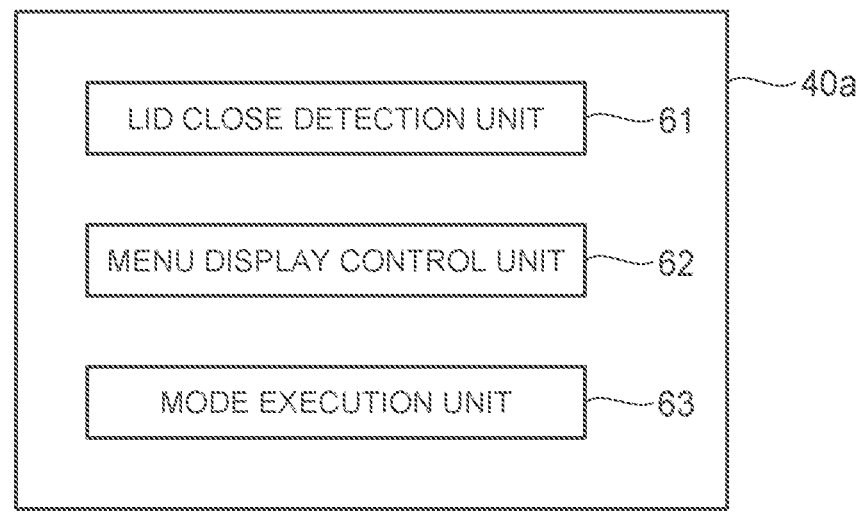
FIG. 11 is a function block diagram illustrating one example of a mode selection function that the information processing apparatus according to the second embodiment of the present disclosure includes.

FIG. 11 is a functional block diagram illustrating one example of a mode selection function that the information processing apparatus 1a according to the second embodiment has. The processing circuitry 40a executes a series of processes for realizing various functions which will be described later. For example, processing procedures for realizing the later described various functions are stored in computer-readable storage media such as the ROM 22a, the flash memory 24a and so forth in the form of programs. The CPU 21a reads the programs into the memory 23a and executes information processing-arithmetic processing and thereby the various functions are realized. Incidentally, the programs may be applied in the form of being installed in advance in the flash memory 24a and the ROM 22a, the form of being provided in a state of being stored in another/other computer-readable storage medium/media, the form of being distributed via the wired or wireless communication unit and so forth. The computer-readable storage media are the magnetic disc, the magneto-optical disc, the CD-ROM, the DVD-ROM, the semiconductor memory and so forth.

The information processing apparatus 1a includes a lid close detection unit 61, a menu display control unit 62 and a mode execution unit 63 as illustrated in FIG. 11.

The lid close detection unit 61 detects the lid closed state. The lid close detection unit 61 detects the lid closed state on the basis of, for example, results of detection by the first acceleration sensor 36 and the second acceleration sensor 37.

More specifically, the lid close detection unit 61 arithmetically calculates the orientation of the first chassis 10 on the basis of the acceleration values $Ax_1(t)$, $Ay_1(t)$ and $Az_1(t)$ in the $X_1$, $Y_1$ and $Z_1$ directions which are output from the first acceleration sensor 36 and arithmetically calculates the orientation of the second chassis 20 on the basis of the acceleration values $Ax_2(t)$, $Ay_2(t)$ and $Az_2(t)$ in the $X_2$, $Y_2$ and $Z_2$ directions which are output from the second acceleration sensor 37. Then, the lid close detection unit 61 arithmetically calculates the attitude angle θ (see FIG. 1) on the basis of the orientation of the first chassis 10 and the orientation of the second chassis 20. Then, in a case where the attitude angle θ which is obtained as a result of execution of the arithmetic calculation is less than a predetermined lid close angle threshold value which is set in advance, the lid close detection unit 61 detects the lid close. The lid close angle threshold value is set in a range from zero degrees or more to 30 degrees or less.

Incidentally, for example, as described in the first embodiment, the lid close may be detected also on the basis of the result of detection by the Hall sensor 31 in place of a way of detecting the lid close on the basis of the values of the acceleration sensors 36 and 37 like this. In addition, the physical switch sensor may be disposed on the first surface of the first chassis 10 or the first surface of the second chassis 20 in such a manner that in a case where the second chassis 20 is closed relative to the first chassis 10 and thereby the physical switch sensor is pushed down, the lid close is detected. It is possible to apply various well-known technologies as the way of detecting the lid close in this way.

Figure 12:
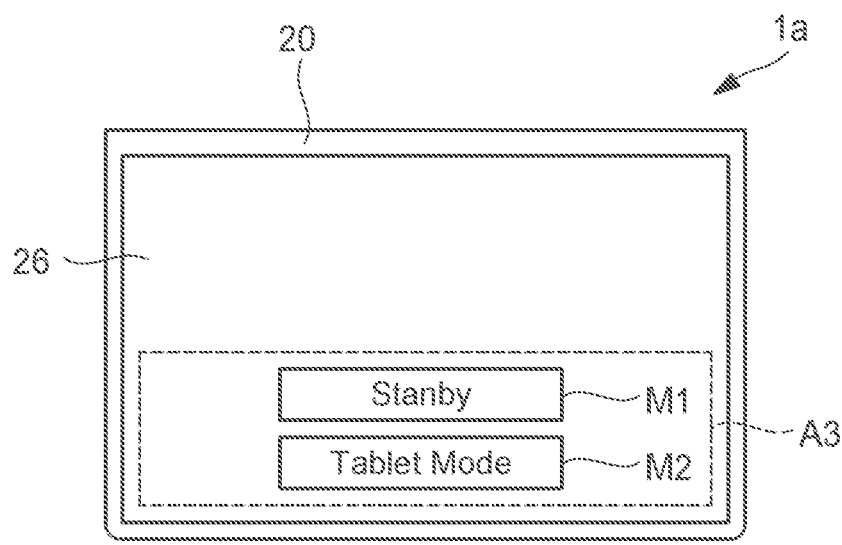
FIG. 12 is a diagram illustrating one display example of a selection menu in the information processing apparatus according to the second embodiment of the present disclosure.

In a case where the lid closed state is detected, the menu display control unit 62 controls to display the selection menu on the second display 26 for a predetermined time period. For example, the menu display control unit 62 controls to display the selection menu which includes the plurality of modes as options in a menu display area A3 on the second display 26 as illustrated in FIG. 12. FIG. 12 is a diagram illustrating one example of display of the selection menu when the information processing apparatus 1a is viewed from an upper surface in the lid closed state. In FIG. 12, the "STANDBY (mode)" M1 which relates to the power save function mode and the "TABLET MODE" M2 which relates to the operation mode are exemplified in FIG. 12.

The menu display area A3 is virtually disposed, for example, in the vicinity of one side section of the second display 26 which is opposite to the other side section of the second display 26 which is close to the coupling part between the first chassis 10 and the second chassis 20. Owing to display of the selection menu on such a position as mentioned above, in a case where the user performs a lid closing operation, it becomes possible to display the selection menu around a position where the user holds the second chassis 20 with the hand. Thereby, it becomes possible for the user to select the desirable mode from the selection menu with ease without making a big movement with the hand.

Concrete examples of other modes which are displayed in the menu display area A3 are as described in the first embodiment and therefore description thereof is omitted here.

The mode execution unit 63 executes one mode which is selected from the selection menu by the user. For example, in the selection menu display example which is illustrated in FIG. 12, in a case where the "TABLET MODE" M2 is selected, the mode execution unit 63 executes the tablet mode. Thereby, a display screen which is suited to use the information processing apparatus 1a as the tablet terminal is displayed on the second display 26. In addition, in a case where any mode is not selected by the user in the time period for which the selection menu is displayed on the second display 26, the mode execution unit 63 executes the mode which is set as the default.

Figure 13:
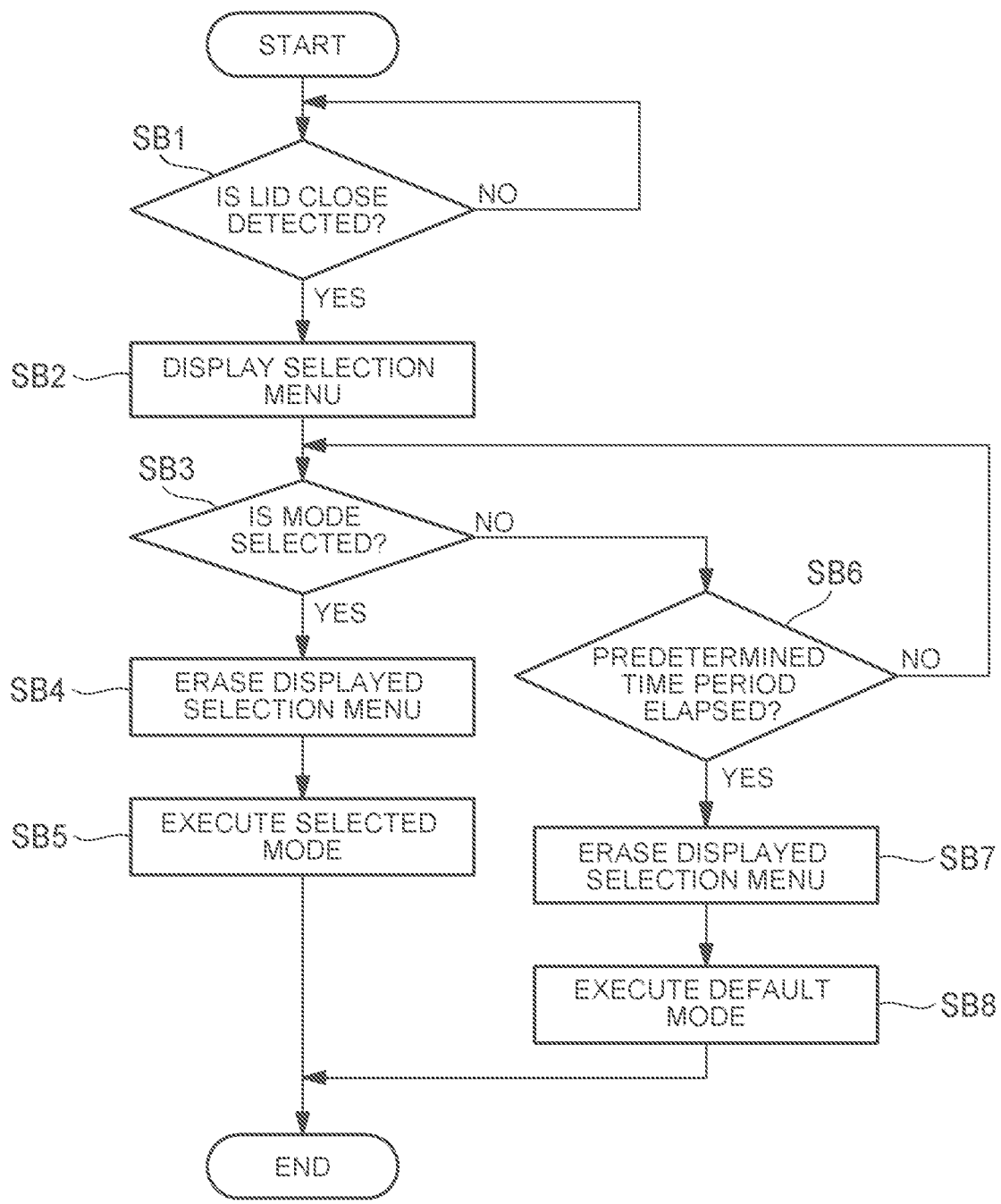
FIG. 13 a flowchart illustrating one example of processing procedures of a mode selection method for the information processing apparatus according to the second embodiment of the present disclosure.

Next, the mode selection method for the information processing apparatus 1a according to the second embodiment will be described with reference to FIG. 13. FIG. 13 is a flowchart illustrating one example of processing procedures of the mode selection method for the information processing apparatus 1a according to the second embodiment.

Respective processes which are indicated in the following are stored in the computer-readable storage media such as, for example, the ROM 22a, the flash memory 24a and so forth in the form of programs and the CPU 21a of the processing circuitry 40a reads out these programs into the memory 23a and executes information processing-arithmetic processing and thereby sequentially proceeds with the processes. Incidentally, the programs may be also applied in the form of being installed in advance in the flash memory 24a and the ROM 22a, the form of being provided in a state of being stored in another/other computer-readable storage medium/media, the form of being distributed via the wired or wireless communication unit and so forth. The computer-readable storage media are the magnetic disc, the magneto-optical disc, the CD-ROM, the DVD-ROM, the semiconductor memory and so forth.

The mode selection method for the information processing apparatus 1a which is illustrated in FIG. 13 is processing which is repetitively executed at a predetermined timing or at predetermined time intervals in the time period that the lid close is not detected.

First, whether the lid close is detected is decided (SB1). In a case where the lid close is not detected (SB1: NO), the stand-by state lasts until the lid close is detected.

In a case where the lid close is detected (SB1: YES), the selection menu which includes the plurality of modes is displayed in the menu display area A3 (see FIG. 12) on the second display 26 (SB2). Then, whether any one of the modes is selected from the displayed selection menu by the user is decided (SB3). As a result of decision, in a case where one mode is selected (SB3: YES), the selection menu which is displayed on the second display 26 is erased (SB4), the selected mode is executed (SB5) and then execution of the processing is terminated. Thereby, the mode which is selected by the user, that is, the mode that the user wishes to execute is executed in the lid closed state.

On the other hand, in a case where any mode is not selected by the user (SB3: YES), whether a predetermined time period has elapsed is decided (SB6), and in a case where the predetermined time period does not elapse (SB6: NO), the process returns to step SB3. On the other hand, in a case where the predetermined time period has elapsed (SB6: YES), the selection menu which is displayed on the second display 26 is erased (SB7), the mode which is set as the default is executed (SB8) and execution of the processing is terminated.

Then, in addition, in a case where the second chassis 20 is opened relative to the first chassis 10 from the lid closed state and therefor the lid close is no longer detected, the mode selection method is again executed.

Next, one example of software configurations used for realizing the mode selection method for the information processing apparatus 1a will be described with reference to FIG. 14.

Figure 14:
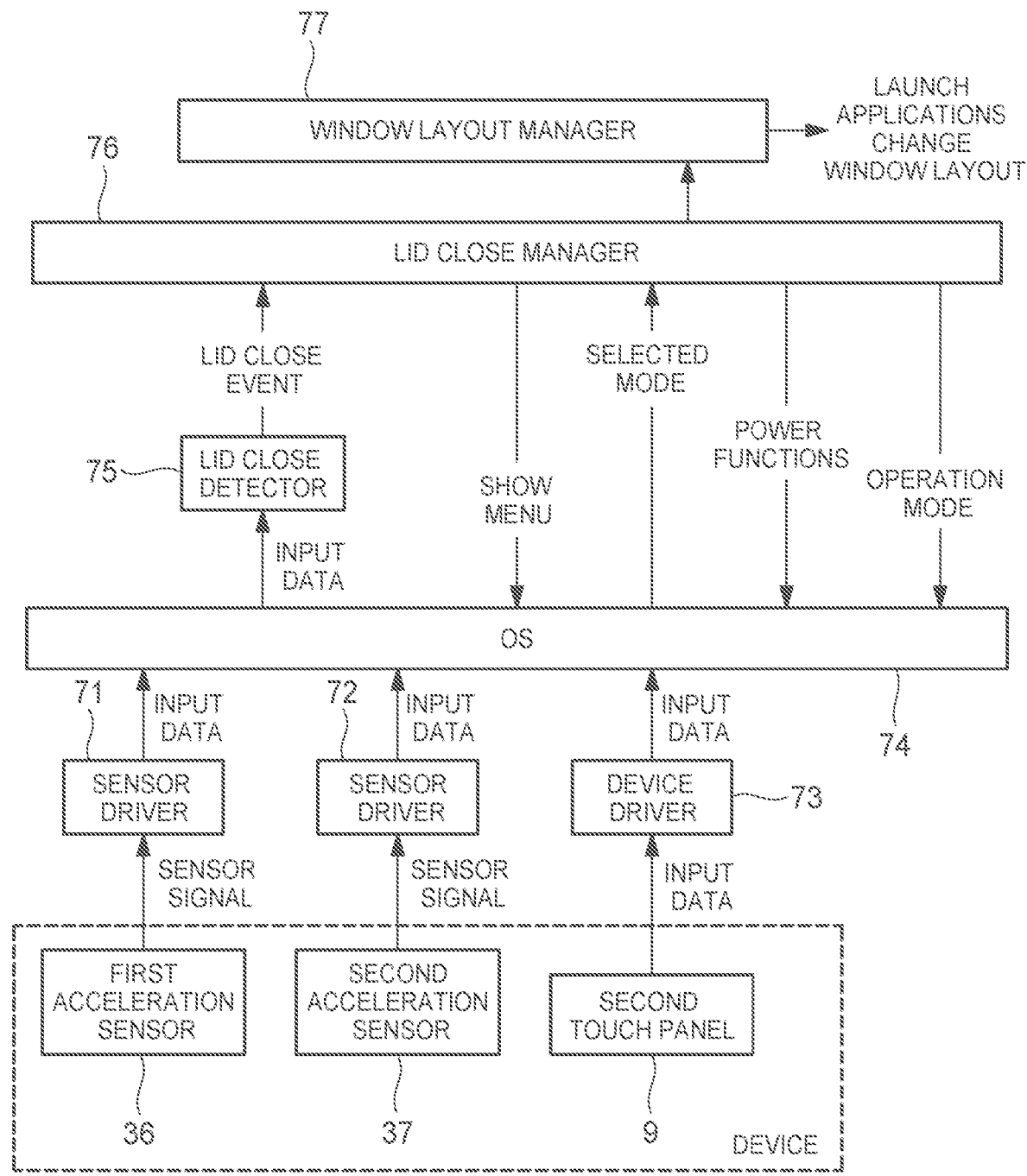
FIG. 14 is a diagram illustrating one example of software configurations for realizing the mode selection method for the information processing apparatus according to the second embodiment of the present disclosure.

As illustrated in FIG. 14, the information processing apparatus 1a includes a sensor driver 71, a sensor driver 72, a device driver 72, an OS 74, a lid close detector 75, a lid close manager 76 and a window layout manager 77.

The lid close detector 75 typically monitors inputs from the first acceleration sensor 36 and the second acceleration sensor 37, arithmetically calculates the attitude angle θ on the basis of input data from the first acceleration sensor 36 and the second acceleration sensor 37, and in a case where the attitude angle θ is less than the lid close angle threshold value, notifies the lid close manager 76 of the lid close event. In the example in FIG. 14, a function of the lid close detection unit 61 (see FIG. 11) is realized by the lid close detector 75 in this way. Although, the lid close is detected on the basis of the inputs from the acceleration sensors 36 and 37 in the example in FIG. 14, the way of detecting the lid close is not limited to this example. That is, the way of detecting the lid close that the Hall sensor is used and the way of detecting the lid close which is based on the physical switch may be also used as described above.

The lid close manager 76 receives the lid close event from the lid close detector 75 and then outputs a selection menu display command which instructs to display the selection menu to the OS 74.

Thereby, the selection menu which is configured by the various modes is displayed in the menu display area A3 on the second display 26 (see FIG. 12). One example of the modes to be displayed here is as described in the first embodiment. In the example in FIG. 14, a function of the menu display control unit 62 (see FIG. 11) is realized by the OS 74 in this way.

In a case where the input operation for selecting any one of the modes which are displayed on the second display 26 is performed by the user, a signal of the touch sensor concerned which configures the second touch panel 9 is output to the device driver 73 and an input signal (for example, a coordinate position of the touch concerned) is output from the device driver 73 to the OS 74. The OS 74 interprets the mode which is selected by the user on the basis of the input signal and the screen configuration of the second display 26 and outputs the mode to the lid close manager 76. The lid close manager 76 outputs an execution command to one notification destination which accords with the function of the mode in order to execute the mode which is notified from the OS 74. The execution command to be output to each notification destination is the same as that in the first embodiment.

Although the present disclosure is described as above by using the respective embodiments, the technical scope of the present disclosure is not limited to the technical scope which is described in the respective embodiments. It is possible to modify and improve the embodiments in a variety of ways without deviating from the gist of the present disclosure and forms which are so modified and improved are also included in the technical scope of the present disclosure. In addition, forms which are obtained by appropriately combining together the embodiments are also included in the technical scope of the present disclosure.

In addition, also the flows of the processing of the mode selection methods which are described in the respective embodiments are merely examples and unnecessary steps may be deleted, a new step may be added and the order of processes to be executed may be changed within the range not deviating from the gist of the present disclosure.

The invention claimed is:

1. An information processing apparatus comprising:
a first chassis;
a second chassis which is configured to be coupled to, and openable and closable with, the first chassis;
a first display disposed on a first surface of the second chassis which faces the first chassis, wherein the first surface is on a front side of the second chassis;
a second display disposed on a second surface of the second chassis, wherein the second surface is on a back side of the second chassis, wherein the back side and the front side are opposite sides of the second chassis; and
a processing circuitry, wherein
the processing circuitry is configured to:
 detect a lid close action wherein a user is about to close the first chassis,
 in a case where the lid close action is detected, display a selection menu which is used for selecting a mode to be executed in a lid closed state and the selection menu includes a plurality of modes on the first display or the second display;
 in a case where the lid close action is detected, display the selection menu on the first display;
 in a case where any one of the modes in the selection menu is selected, store the selected mode into a memory;
 after the selected mode is stored, detect a lid close;
 in a case where the lid close is not detected, detect whether a predetermined time period has elapsed; and
 in a case where the predetermined time period has elapsed, erase the stored selected mode.

2. The information processing apparatus according to claim 1, wherein
the processing circuitry displays the selection menu in a menu display area which is virtually disposed in a vicinity of one side section of the first display which is opposite to another side section of the first display which is close to a coupling part between the first chassis and the second chassis.

3. The information processing apparatus according to claim 1, wherein
the processing circuitry,
 in a case where the lid close is detected, displays the selection menu on the second display, and
 in a case where any one of the modes in the selection menu is selected, executes the selected mode.

4. The information processing apparatus according to claim 3, wherein
the processing circuitry displays the selection menu in a menu display area which is virtually disposed in a vicinity of one side section of the second display which is opposite to another side section of the second display which is close to a coupling part between the first chassis and the second chassis.

5. The information processing apparatus according to claim 1, wherein
 in a case where any one of the modes in the selection menu is selected, the processing circuitry executes the selected mode in the lid closed state.

6. The information processing apparatus according to claim 1, wherein
the plurality of modes relates to a power save function, a screen display function or an operation mode.

7. The information processing apparatus according to claim 1, wherein
the second display includes a touch panel, and
 in a case where a number of touches of the touch panel is more than a predetermined number the touches are simultaneously detected in a predetermined lid close detection area which is virtually disposed on the touch panel, the processing circuitry detects the lid close action.

8. The information processing apparatus according to claim 7, wherein
a lid close detection area is disposed in a vicinity of one side section of the touch panel which is opposite to another side section of the touch panel which is close to a coupling part between the first chassis and the second chassis.

9. The information processing apparatus according to claim 1, wherein
the first display includes a first touch panel,
the second display includes a second touch panel, and
 in a case where one or more touches and a number of touches is more than a predetermined number, and the touches are simultaneously detected on the first touch panel and on the second touch panel respectively, the processing circuitry detects the lid close action.

10. The information processing apparatus according to claim 1, wherein
 in a case where an attitude angle between the first chassis and the second chassis is less than an action angle threshold value which is set in advance, the processing circuitry detects the lid close action.

11. The information processing apparatus according to claim 1, wherein
 in a case where an attitude angle between the first chassis and the second chassis is less than a lid close angle threshold value which is set in advance, the processing circuitry detects the lid close.

12. A mode selection method for an information processing apparatus which includes a first chassis; a second chassis which is configured to be coupled to, and openable and closeable with, the first chassis; a first display disposed on a first surface of the second chassis which faces the first chassis, wherein the first surface is on a front side of the second chassis; a second display disposed on a second surface of the second chassis, wherein the second surface is on a back side of the second chassis, wherein the back side and the front side are opposite sides of the second chassis, and a processing circuitry, comprising:
 detecting a lid close action wherein a user is about to close the first chassis by the processing circuitry; and
 in a case where the lid close action is detected, displaying a selection menu which is used for selecting a mode to be executed in a lid closed state and the selection menu includes a plurality of modes on the first display or the second display by the processing circuitry;
 in a case where the lid close action is detected, display the selection menu on the first display;
 in a case where any one of the modes in the selection menu is selected, store the selected mode into a memory;

after the selected mode is stored, detect a lid close;
in a case where the lid close is not detected, detect whether a predetermined time period has elapsed; and
in a case where the predetermined time period has elapsed, erase the stored selected mode.

\* \* \* \* \*